UNITED STATES PATENT OFFICE.

CHARLES C. MOORE, OF WASHINGTON, DISTRICT OF COLUMBIA.

PROCESS OF TREATING CASSAVA AND PRODUCTS THEREOF.

1,016,762.   Specification of Letters Patent.   Patented Feb. 6, 1912.

No Drawing.   Application filed May 7, 1910.  Serial No. 559,907.

*To all whom it may concern:*

Be it known that I, CHARLES C. MOORE, a citizen of the United States, residing at Washington, in the District of Columbia, have invented certain new and useful Improvements in Processes of Treating Cassava and Products Thereof, of which the following is a specification.

This invention relates to processes of treating cassava and products thereof; and it comprises a process of producing a sugary material from cassava by treating fresh cassava in such manner as to arrest enzymic action, separating starch therefrom and evaporating the liquid from which such starch has been separated; and it also comprises a concentrated sugary material containing the natural sugars of cassava in substantially their original ratio; all as more fully hereinafter set forth and as claimed.

Cassava or manioc produces a very large yield per acre of tubers rich in total carbohydrates, and grows thriftily in parts of the country and upon soils where no other field crop does well, but hitherto because of inherent difficulties it has not been utilized much in the arts. In the fresh state, immediately after digging, the tubers contain from 4 to 14 per cent. of sugars or soluble fermentable matter, and 20 to 35 per cent. of starch, but these percentages rapidly decrease thereafter as the tubers at once begin to spoil. They cannot be stored and it is ordinarily impracticable to keep them over a day or so after digging without great deterioration. This is ordinarily ascribed to the action of bacteria and yeast, and no doubt this plays some part, particularly where the tubers are peeled, bruised or broken, for the high content of sugar in the juices makes them very susceptible of fermentation. But, as I have discovered, enzymic activity of the juices and tissues of the fresh tubers is much more responsible for the rapid deterioration. Cassava is rich in enzymic bodies which begin their work at once upon digging of the tubers and produce extensive and far-reaching changes in the tissues and constituents thereof. In a little time after digging, a section of a tuber will show clearly apparent rings where tissue and constituents have been changed and altered. Certain of these enzymic bodies produce hydrocyanic acid and cyanids, causing the well-known poisonous nature of some varieties of fresh cassava. Certain other enzyms, appearing to be always present in fresh cassava, rapidly break down the starch into soluble bodies, apparently at first into dextrin and other ill-defined soluble bodies, which are, at least in part, of an unfermentable non-sugary nature. The cellular tissue apparently shares in this degradation. The contained sugars also tend to disappear in some manner even prior to access of yeast and bacteria. Proteolytic enzyms also appear to be present. Still another, and very important, action of enzymic nature, always noticed in cut or broken tubers is a blackening or discoloration; probably due to the presence of a "laccase" or "oxidase". This discoloration is a serious hindrance to the manufacture of high grade starch and syrup from the fresh tuber.

Expensive experience has shown the experimenters in this field that utilization of cassava tubers more than a day or so old is substantially impracticable. Apart from the question of supply to a factory of any large capacity, to make starch on any but the smallest scale has not been feasible heretofore because of difficulties caused by souring and spoiling in the starch apparatus. The stated enzymic actions rapidly convert the material into forms very suitable for bacterial growth. These difficulties have also prevented any attempts at the direct utilization of the tubers for commercial purposes. The liquid obtained by pressing the tubers after standing a brief period of time or by extraction by water is discolored, is difficult to handle because of its changeability and does not upon concentration give a good and useful syrup. The original sugars have been changed to some extent, staining dark colored bodies are present, the liquid is contaminated with dextrins and other non-sugary carbohydrates and the proteolytic enzyms have produced indefinite soluble proteid bodies. I have however discovered that if the enzymic activity of the cassava be arrested, these difficulties disappear and it is perfectly possible to utilize both the starch and the sugars or fermentable soluble bodies of the tubers. Cassava starch, because of its inherent advantageous properties, is much desired in the trade and it is best recovered as such in lieu of being hydrolyzed and fermented, as has been proposed, and with such recovery in the manner hereinafter described, the natural sugars of the tuber are left in a form available for recovery by a simple concentration of the liquid from which the starch has been separated. Their quantity and character make them eminently suitable for this purpose. Low-grade dirty starch, scums, fibers and precipitates produced in the process may be hydrolyzed and added to the sugary liquid.

I have discovered that in order to arrest, neutralize or destroy enzymic activity and make cassava suitable for utilization, it is necessary to comminute the tubers as soon as practicable after digging and treat the pulp, shreds or slices in such manner as to prevent contained enzyms from functioning. A very simple way, ordinarily best conducted on the farm where the tubers are produced, is to rasp or thinly slice them to convert them into a finely divided form and dry at once and as rapidly as possible, consistent with a temperature low enough to be below the hydrolyzing point of starch. It is frequently possible in the sunny portions of the country where cassava grows to the best advantage, to effect sufficiently rapid drying by exposing very thin or frequently stirred layers of rasped or grated cassava in trays to the direct action of sun or wind. Or the rasped or sliced cassava may be quickly dried in any of the commercial forms of low-temperature driers. Drying at a speed sufficient to outstrip the enzymic activity of the cassava is absolutely necessary and the comminuted tubers must not be allowed to stand untreated. When the available facilities for rapid drying are inadequate, I have found that by adding soluble salts, such as common salt or alkali sulfites, or dilute acids the activity of the enzyms is reduced and the necessity for speed is not so great. For some purposes, the addition of a little sodium carbonate or bicarbonate, or the corresponding potassium salts, or even dusted slaked lime is useful as these alkaline bodies possess a specific enzym-arresting function in the case of starch-hydrolyzing enzyms. Of course where the comminuted cassava can be treated with enzym-arresting chemicals, drying can be performed at leisure or omitted altogether, the wet, treated pulp being stored or worked up at once. Quick comminution after digging and treatment in some manner to arrest the activity of the enzyms are, however, always necessary. And even when the fresh wet treated pulp is used in the factory operation, in the method hereinafted described, it is usually advantageous to employ with it a certain amount of the dried pulp, produced as described. This is for the reason that in factory operations it is often desirable to work with liquids of greater concentration than that of the natural juices of the tubers, say 4 to 14 per cent on the sugar scale. With preliminary desiccation of at least a portion of the material, the obtaining of higher concentrations becomes possible. When dried in the manner described, with or without chemicals the comminuted cassava does not blacken and it preserves its full content of starch and sugars. Dried alone it is very suitable for feeding and like purposes, being perfectly permanent if kept dry. But when so dried alone, if subsequently used in the starch and syrup manufacture it must ordinarily be used only with liquids arresting enzymic activity unless the starch separation be very rapid indeed. Simple drying at low temperatures does not destroy enzyms but merely arrests their activity, and when the dried cassava is moistened the activity of the enzyms recommences.

In the actual operation, I usually rasp, slice or grate the cassava and then pass it between edge-stones together with sufficient liquid to form a starch milk. Where fresh tubers are being employed, they are best preliminarily scoured in a scouring drum of usual construction to remove sand and dirt. In the liquid employed in forming the starch milk, unless chemicals have been employed in drying the cassava or preserving the pulp, I employ suitable chemical means to arrest enzymic activity and also fermentation. A small amount of sulfuric or hydrochloric acid will serve. Lactic acid is also suitable. A portion of the liquid may be allowed to sour to the maximum extent and employed, after sterilization, to acidify the rest of the material. As a rule however, I prefer to employ acid sulfites, such as calcium acid sulfites as their anti-enzymic action is good for the present purposes while they have an additional function in increasing the yield of starch from the dried material as more fully set forth in my copending application Ser. No. 490,411, April 16, 1909. The comminuted tuber may be simply moistened with a solution of calcium acid sulfite and dried, either in the sun or by artificial heat, producing a cream-colored dry material, free from blackening and having the contained sugars and other bodies in substantially the same state as in the original tuber. In this drying however the starch appears to be "ripened" somewhat so that the dry material gives a rather greater yield than does the fresh. In the starch making operation the contained sulfites prevent enzymic action, discoloring, spoiling and changes in the sugars while they are substantially harmless in the resultant syrup. The more rapid the starch separation can be made, the less is the proportion of acid or other chemical necessary in the starch milk. Rapid work can be secured by the use of starch centrifugals, either of the continuous or non-continuous types. The starch from the pure starch zones in these machines after washing may be treated in the usual manner to make merchantable starch. The washings may be returned to the grinders for use in lieu of water, but in any event it is ordinarily desirable to use some dried cassava to make up for the dilution. The liquid separated from the starch by the machine is also to be returned in part to the grinders, the remainder being sent forward for evaporation, after partial neutralization if deemed necessary. Reuse of the separated starch-liquor in starch making is eminently desirable, the addition of too much water, as stated, leading to too great a dilution of the sugar solution. Ordinary starch tables may also be used for separating the starch. The liquor from which the starch has been separated is used in the manner just described. Passing the starch tables, the liquid is murky with suspended coagulum, consisting of fiber, enzyms and other proteids coagulated by the acid or other chemical, and mechanical impurities. This matter should be whirled or otherwise separated from the liquid to clarify the same prior to return to the grinding mill or to delivery to the concentrators. The solids so separated are valuable for feed. Using a centrifugal apparatus, this feed stuff will be found next the dirty starch layers and may be easily separated mechanically. From centrifugals the separated liquor is as a rule sufficiently clarified for use. Employing fresh cassava, which contains around 60 per cent. of water, since the starch and fiber leave the system with only about 12 per cent. of moisture by returning the extracted liquors after separating the starch, there is an evident overplus of such liquid, without taking into consideration the water used in washing starch, etc., and added. It is this overplus which is sent to the evaporators. After producing the starch milk from the dried and preserved cassava, and separating the starch therefrom, the residual liquid is simply concentrated. It may be defecated by any of the usual methods. On making alkaline with lime, the greater part of the sulfite can be precipitated, carrying down with it floating fiber and the like. If desired carbonation can also be resorted to after adding the lime. In the concentration any suitable type of evaporator may be employed. Multiple effect pans are suitable. The material may, if desired be finished in a strike pan in the usual way. The concentration may be carried down to a syrupy consistency or to "string test". Graining is usually hardly practicable though some samples of cassava carry relatively large proportions of cane sugar. The syrupy product obtained is usually nearly white and contains the natural sugars of the cassava in about the same relative proportions as the original tubers. Where an enzym poison, such as calcium acid sulfite, has been employed, it usually contains more or less of this.

What I claim is:—

1. The process of preparing valuable products from cassava which comprises disintegrating fresh cassava, treating to arrest enzymic activity, preparing a starch milk containing the soluble sugars, separating the starch therefrom to form a residual liquor and preparing a concentrated sugary product from such residual liquor.

2. The process of preparing valuable products from cassava which comprises disintegrating fresh cassava, treating to arrest enzymic activity, preparing a starch milk containing soluble sugars with the aid of returned residual liquor, separating the starch therefrom to form residual liquor, returning a portion of the residual liquor to aid in preparing fresh starch milk and evaporating another portion of such residual liquor to obtain concentrated sugary products.

3. The process of preparing valuable products from cassava which comprises disintegrating fresh cassava, treating with enzym-arresting chemicals, preparing a starch milk containing the soluble sugars, separating the starch therefrom to form a residual liquor and preparing a concentrated sugary product from such residual liquor.

4. The process of preparing valuable products from cassava which comprises disintegrating fresh cassava, treating with enzym-arresting chemicals, preparing a starch milk containing soluble sugars with the aid of returned residual liquor, separating the starch therefrom to form residual liquor, returning a portion of the residual liquor to aid in preparing fresh starch milk and evaporating another portion of such residual liquor to obtain concentrated sugary products.

5. The process of preparing valuable products from cassava which comprises disintegrating fresh cassava, treating with enzym-arresting chemicals and drying, preparing a starch milk from the treated cassava, separating the starch therefrom to form a residual liquor and preparing a concentrated sugary product from such residual liquor by evaporation.

6. The process of preparing valuable products from cassava which comprises preparing a starch milk from dried cassava containing enzym-arresting chemicals, separating the starch therefrom to form a residual liquor and preparing a concentrated sugary product from such residual liquor by evaporation.

7. The process of preparing valuable products from cassava which comprises preparing a starch milk from a body of cassava comprising dried cassava containing enzym-arresting chemicals, separating the starch therefrom to form a residual liquor and preparing a concentrated sugary product from such residual liquor.

8. In the preparation of valuable products from cassava, the process which comprises forming a starch milk from cassava, separating the starch therefrom in the presence of enzym-arresting chemicals to form a residual liquor and preparing a concentrated sugary product from such residual liquor.

9. In the preparation of valuable products from cassava, the process which comprises forming a starch milk from a body of cassava comprising cassava dried in the presence of enzym-arresting chemicals, separating starch therefrom in the presence of enzym-arresting chemicals and preparing a concentrated sugary product from the residual liquor.

10. The process of preparing valuable products from cassava which comprises disintegrating fresh cassava, treating with a bisulfite to arrest enzymic activity, preparing a starch milk containing the soluble sugars, separating the starch therefrom to form a residual liquor and preparing a concentrated sugary product from such residual liquor.

11. The process of preparing valuable products from cassava which comprises disintegrating fresh cassava, treating with a bisulfite to arrest enzymic activity, preparing a starch milk containing soluble sugars with the aid of returned residual liquor, separating the starch therefrom to form residual liquor, returning a portion of the residual liquor to aid in preparing fresh starch milk and evaporating another portion of such residual liquor to obtain concentrated sugary products.

12. The process of preparing valuable products from cassava which comprises disintegrating fresh cassava, treating with a bisulfite, preparing a starch milk containing the soluble sugars, separating the starch therefrom to form a residual liquor and preparing a concentrated sugary product from such residual liquor.

13. The process of preparing valuable products from cassava which comprises disintegrating fresh cassava, treating with a bisulfite, preparing a starch milk containing soluble sugars with the aid of returned residual liquor, separating the starch therefrom to form residual liquor, returning a portion of the residual liquor to aid in preparing fresh starch milk and evaporating another portion of such residual liquor to obtain concentrated sugary products.

14. The process of preparing valuable products from cassava which comprises disintegrating fresh cassava, treating with a bisulfite and drying, preparing a starch milk from the treated cassava, separating the starch therefrom to form a residual liquor and preparing a concentrated sugary product from such residual liquor by evaporation.

15. The process of preparing valuable products from cassava which comprises preparing a starch milk from dried cassava containing a bisulfite, separating the starch therefrom to form a residual liquor and preparing a concentrated sugary product from such residual liquor by evaporation.

16. The process of preparing valuable products from cassava which comprises preparing a starch milk from a body of cassava comprising dried cassava containing a bisulfite, separating the starch therefrom to form a residual liquor and preparing a concentrated sugary product from such residual liquor.

17. In the preparation of valuable products from cassava, the process which comprises forming a starch milk from cassava, separating the starch therefrom in the presence of a bisulfite to form a residual liquor and preparing a concentrated sugary product from such residual liquor.

18. In the preparation of valuable products from cassava, the process which comprises forming a starch milk from a body of cassava comprising cassava dried in the presence of a bisulfite, separating starch therefrom in the presence of a bisulfite and preparing a concentrated sugary product from the residual liquor.

In testimony whereof, I affix my signature in the presence of witnesses.

CHARLES C. MOORE.

Witnesses:
  K. P. McElroy,
  C. W. Fowler.